(12) United States Patent
Solar et al.

(10) Patent No.: US 11,667,231 B2
(45) Date of Patent: Jun. 6, 2023

(54) VEHICLE VISION SYSTEM WITH SELF-CALIBRATING IMAGER

(71) Applicants: Magna Electronics Solutions GmbH, Sailauf (DE); Magna Electronics Europe GmbH & Co. OHG, Sailauf (DE); ZKW Group GmbH, Wieselburg (AT)

(72) Inventors: Martin Solar, Erlenbach (DE); Stefan Graf, Wetzlar (DE); Julian Baker, Mank (AT); Matthäus Artmann, Ybbs An der Donau (AT)

(73) Assignees: Magna Electronics Solutions Gmbh; Magna Electronics Europe Gmbh & Co. OHG; ZKW Group Gmbh

( * ) Notice: Subject to any disclaimer, the term of this patent is extended or adjusted under 35 U.S.C. 154(b) by 555 days.

(21) Appl. No.: 16/693,532

(22) Filed: Nov. 25, 2019

(65) Prior Publication Data

US 2020/0164792 A1 May 28, 2020

Related U.S. Application Data

(60) Provisional application No. 62/771,263, filed on Nov. 26, 2018.

(51) Int. Cl.
*B60Q 1/00* (2006.01)
*H05B 47/11* (2020.01)
(Continued)

(52) U.S. Cl.
CPC ............ *B60Q 1/0023* (2013.01); *B60Q 1/143* (2013.01); *G06V 10/141* (2022.01); *G06V 20/56* (2022.01); *G06V 20/584* (2022.01); *H05B 47/11* (2020.01)

(58) Field of Classification Search
CPC ...... G06V 20/584; B60Q 1/0023; B60Q 1/04; B60Q 1/085; B60Q 1/16; B60Q 1/143;
(Continued)

(56) References Cited

U.S. PATENT DOCUMENTS

| | | |
|---|---|---|
| 5,550,677 A | 8/1996 | Schofield et al. |
| 5,670,935 A | 9/1997 | Schofield et al. |

(Continued)

FOREIGN PATENT DOCUMENTS

| | | |
|---|---|---|
| DE | 102005055087 A1 | 5/2007 |
| DE | 102012004817 A1 | 9/2013 |

(Continued)

OTHER PUBLICATIONS

International Search Report and Written Opinion dated Jun. 4, 2020 from corresponding PCT Application No. PCT/EP2019/082436.

*Primary Examiner* — Arman B Fallahkhair
(74) *Attorney, Agent, or Firm* — Honigman LLP

(57) ABSTRACT

A vehicular vision system includes a camera disposed at a vehicle and having a field of view exterior of the vehicle, a light source disposed at the vehicle and operable to emit light, and a control. Light emitted by the light source, when operated, illuminates a field of illumination exterior of the vehicle, with the field of view of the camera encompassing at least a portion of the field of illumination. The control, responsive to data processing by a processor of the control of image data captured by the camera, determines a change in the field of illumination provided by the light source. Responsive to the determined change in the field of illumination, the control at least one selected from the group of (i) adjusts the light source to accommodate the determined change, (ii) adjusts the camera to accommodate the determined change and (iii) generates an alert.

24 Claims, 2 Drawing Sheets

(51) Int. Cl.
*B60Q 1/14* (2006.01)
*G06V 20/58* (2022.01)
*G06V 10/141* (2022.01)
*G06V 20/56* (2022.01)

(58) Field of Classification Search
CPC ....... B60W 2050/146; B60W 2420/42; B60W 40/02; B60W 50/14; F21S 41/60
See application file for complete search history.

(56) References Cited

U.S. PATENT DOCUMENTS

| | | | |
|---|---|---|---|
| 5,949,331 A | 9/1999 | Schofield et al. | |
| 7,227,611 B2* | 6/2007 | Hull | H05B 47/11 |
| | | | 348/E5.142 |
| 7,653,215 B2* | 1/2010 | Stam | G06V 20/56 |
| | | | 382/104 |
| 7,914,187 B2 | 3/2011 | Higgins-Luthman et al. | |
| 8,017,898 B2* | 9/2011 | Lu | B60Q 1/1423 |
| | | | 340/937 |
| 8,162,518 B2 | 4/2012 | Schofield | |
| 9,981,594 B2* | 5/2018 | Sherman | G06V 20/56 |
| 10,427,592 B2* | 10/2019 | Kearney | B60Q 1/0076 |
| 10,889,232 B2* | 1/2021 | Park | B60Q 11/005 |
| 11,254,256 B2* | 2/2022 | Drueppel | B60Q 1/085 |
| 2016/0311374 A1* | 10/2016 | May | B60R 1/00 |
| 2017/0217367 A1 | 8/2017 | Pflug et al. | |

FOREIGN PATENT DOCUMENTS

| | | |
|---|---|---|
| EP | 1515293 A1 | 3/2005 |
| EP | 1876829 A1 | 1/2008 |
| EP | 3388814 A2 | 10/2018 |
| WO | 2017019725 A1 | 2/2017 |

* cited by examiner

VEHICLE VISION SYSTEM WITH SELF-CALIBRATING IMAGER

CROSS REFERENCE TO RELATED APPLICATION

The present application claims the filing benefits of U.S. provisional application Ser. No. 62/771,263, filed Nov. 26, 2018, which is hereby incorporated herein by reference in its entirety.

FIELD OF THE INVENTION

The present invention relates generally to a vehicle vision system for a vehicle and, more particularly, to a vehicle vision system that utilizes at least one exterior-sensing sensor and at least one exteriorly directed light source.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a driver assistance system or vision system or imaging system for a vehicle that utilizes one or more cameras (such as a camera disposed at the vehicle and having a field of view exterior of the vehicle) or one or more sensors (such as LIDAR sensors) to capture data representative of an area exterior of the vehicle. The system, via processing of data captured by the camera or sensor, determines a change in the light field or field of illumination provided by a light source of the vehicle (such as a headlamp or auxiliary light source of the vehicle that illuminates an area exterior of the vehicle and that is at least partially in the field of sensing or field of view of a sensor or camera of the vehicle). Responsive to a determined change in the light field or field of illumination, the system either compensates or accommodates the error or change (such as via adjusting the light source mechanically or electrically or electromechanically) or generates an alert that is indicative of the determined change.

These and other objects, advantages, purposes and features of the present invention will become apparent upon review of the following specification in conjunction with the drawings.

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

Figure 1:
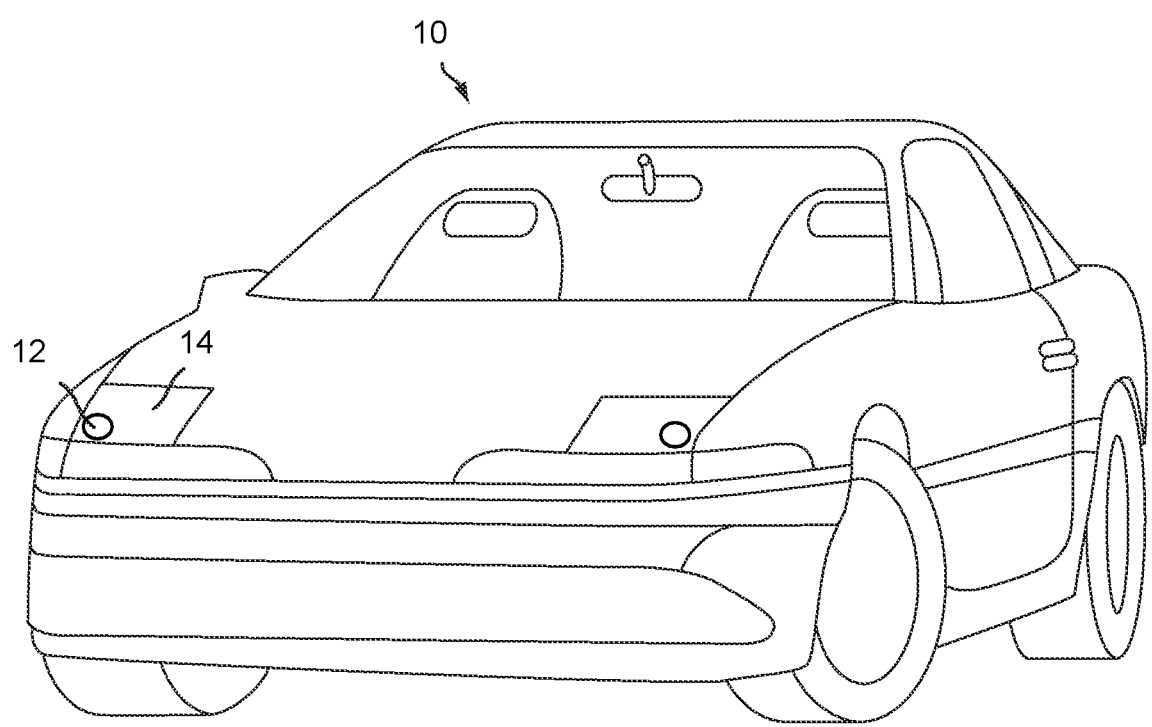
FIG. 1 is a perspective view of a vehicle with a vision system that incorporates a headlamp alignment system in accordance with the present invention.

Referring now to the drawings and the illustrative embodiments depicted therein, a vision system for a vehicle 10 includes at least one exterior viewing imaging sensor or camera 12, such as a forward viewing imaging sensor or camera, which may be disposed in one or both of the headlamps 14 of the vehicle (FIG. 1). Optionally, the system may include multiple exterior viewing imaging sensors or cameras, such as a forward viewing camera at the front of the vehicle, and a sideward/rearward viewing camera at respective sides of the vehicle, and a rearward viewing camera at the rear of the vehicle, which capture images exterior of the vehicle. The camera or cameras each include a lens for focusing images at or onto an imaging array or imaging plane or imager of the camera. Optionally, the forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The system includes a control or electronic control unit (ECU) or processor that is operable to process image data captured by the camera or cameras and may detect objects or the like and/or provide displayed images at a display device for viewing by the driver of the vehicle. The data transfer or signal communication from the camera to the ECU may comprise any suitable data or communication link, such as a vehicle network bus or the like of the equipped vehicle.

A correct adjustment of the headlight or regular inspection of it is necessary for optimum visibility—without dazzling. Automatic detection of a defective position can help to correct it or send an error signal. Sensors may be provided in the headlamps, whereby precise position and alignment of the sensors is also important.

In some implementations, the system provides an exterior sensor (such as a camera or a LIDAR sensor) that is rigidly or fixedly connected to the supporting frame of the light module. The sensor may be advantageously mounted in the headlamp for an extended field of view (all-round view).

Figure 2:
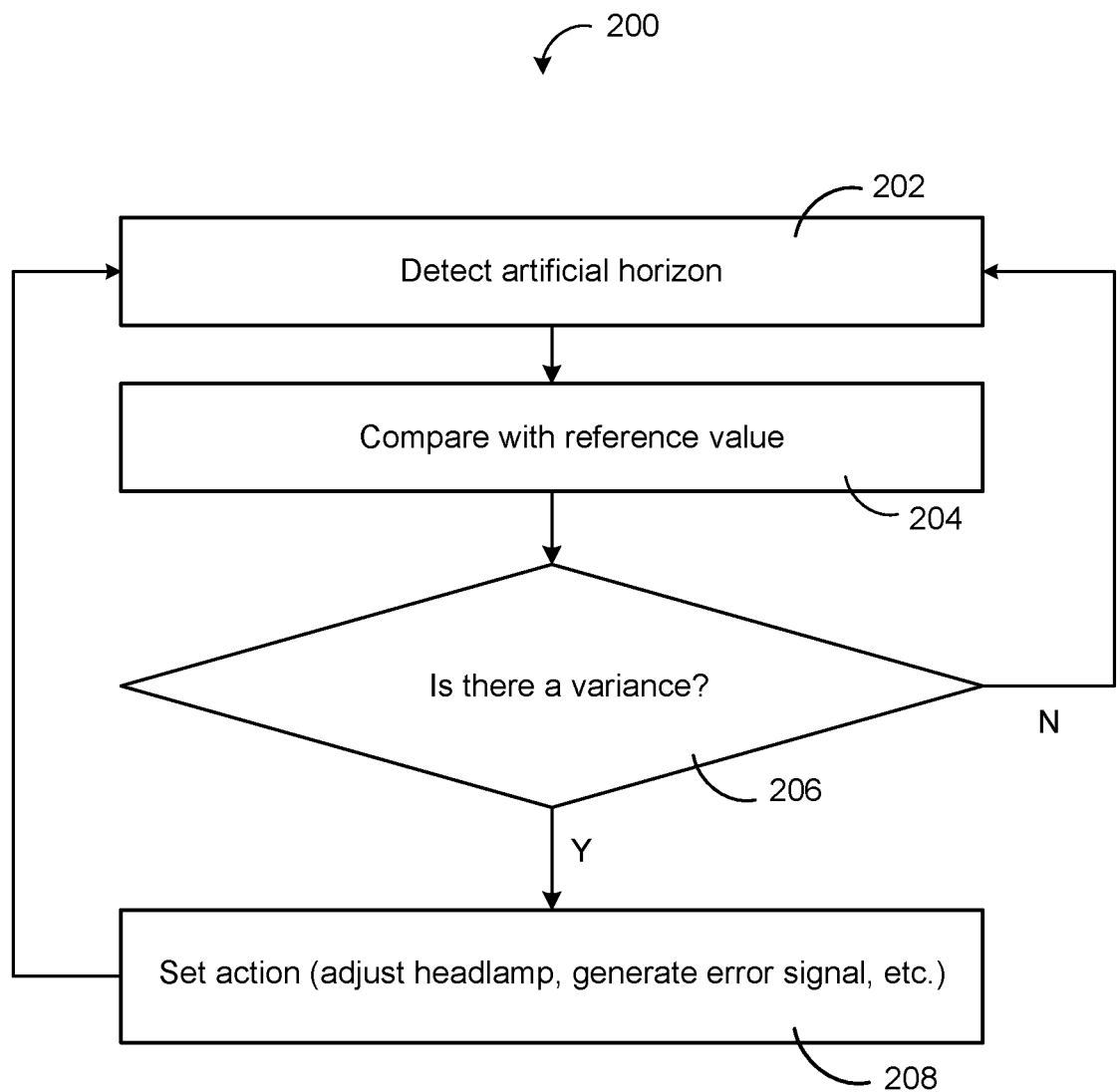
FIG. 2 is a flow chart of a mode of operation of the vision system.

The exterior sensor may capture data relative to an artificial horizon. A static or dynamic change of position of the exterior sensor may be determined (via processing by a data processor of data captured by the sensor) by determining a change in the artificial horizon of the exterior sensor by comparing the position of the artificial horizon to a reference value. If a variation above a certain or predetermined threshold is determined, the system corrects the position of the exterior sensor in order to compensate the change of position. The exterior sensor and the light module may be rigidly or fixedly connected to the same supporting frame so as to be adjusted in tandem with one another when the supporting frame is adjusted. Thus, a correction of the position of the exterior sensor due to the detected change in the artificial horizon adjusts or corrects the light module position simultaneously. In other words, the position of the external sensor and the light module can be changed simultaneously and to the same extent. FIG. 2 is a flowchart 200 of this process, where the artificial horizon is detected at 202 and compared with a reference value at 204. The difference or variance is determined at 206, and if there is no difference, the process starts over. If a difference is determined at 206, the system adjusts the headlamp or generates an alert or error signal or the like at 208.

Typically a correct vertical alignment is important for a forward or rearward directed light, so that the light beam emitted by the headlamp is not too low (whereby the light does not extend a sufficient amount forward of the vehicle for safe driving) or too high (whereby the light may dazzle or bother drivers of oncoming vehicles. If the light module (such as the light module of the headlamp) undergoes a change in position, this can be determined via the sensor, which evaluates it metrologically or with imaging algorithms.

For example, the data processor may process image data captured by the camera to determine the illumination field (the area encompassed by the light emitted by the light source) provided by the headlamp (or other light source). When the data processor (via processing of image data captured by the camera) determines a change in the illumination field (when the headlamps are activated, but not when changed to a different lighting condition, such as changed from low beams to high beams), the system or control may adjust the headlamps to return the illumination field to its original or correct state, or the system or control may generate an alert (such as to the driver of the vehicle or to a remote server or the like) indicative of the headlamps being out of alignment and needing adjustment.

Thus static (load condition, setting behavior or the like) and dynamic (acceleration changes) position changes of the headlamps can be compensated or accommodated or corrected.

Automatic calibration on the artificial horizon can be used as an imaging algorithm. If the position (of the light module and the camera) changes, a new horizon with a difference signal to the original position is defined during the next self-calibration (such as when the headlamps are activated or set to the low beam setting or the like). This difference signal is directly proportional to the change in position and can be processed further to determine the degree of misalignment of the light source.

Responsive to a determined misalignment, for example, the light module can be moved into a corrected position (compensation by means of a light width (clearance) adjuster) or an error signal can be sent (if the change exceeds a permitted threshold value). With high-resolution lighting systems, which offer a corresponding vertical resolution, a displacement of the light image can be obtained for compensation.

The system provides for use of a camera or other sensor (e.g., a LIDAR sensor) in the headlight. The self-calibration algorithm is used to adjust (correct) a light module or sensor when a change in the field of illumination is determined (via processing of data captured by the camera or sensor). The system provides for detection of an adjustment/change of the light image or field of illumination provided by a light source, such as due to changes within the light module, and provides for correction or alert generation when such detection occurs. The system thus provides for correctly adjusted headlights and/or optimally aligned sensors.

Thus, the system of the present invention determines a change in the light field or field of illumination provided by a light source of the vehicle (such as a headlamp or auxiliary light source of the vehicle that illuminates an area exterior of the vehicle and that is at least partially in the field of sensing or field of view of a sensor or camera of the vehicle).

Responsive to a determined change in the light field or field of illumination, the system either compensates or accommodates the error or change (such as via adjusting the light source mechanically or electrically or electromechanically) or generates an alert that is indicative of the determined change.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular vision system, the vehicular vision system comprising:
   a camera disposed at a vehicle, the camera having a field of view at least forward of the vehicle, the camera operable to capture frames of image data representative of an area forward of the vehicle;
   a directed light source disposed at the vehicle and operable to emit light when activated, wherein the directed light source comprises a headlamp of the vehicle, and wherein light emitted by the directed light source, when activated, illuminates a field of illumination forward of the vehicle;
   wherein the field of view of the camera encompasses at least a portion of the field of illumination;
   a control comprising an image processor and associated circuitry, wherein frames of image data captured by the camera are provided to the control for processing by the image processor;
   wherein the frames of image data provided to the control comprise (i) a first frame of image data captured by the camera with the directed light source set to a selected light setting, and (ii) a second frame of image data captured by the camera subsequent to the first frame of image data and with the directed light source set to the selected light setting;
   wherein the control, via image processing by the image processor of at least the first and second frames of image data captured by the camera, determines (i) a first field of illumination of the directed light source present in the first frame of image data and indicative of alignment of the directed light source relative to the vehicle during capture of the first frame of image data, and (ii) a second field of illumination of the directed light source present in the second frame of image data and indicative of alignment of the directed light source relative to the vehicle during capture of the second frame of image data;
   wherein the control, responsive to determining the first field of illumination and the second field of illumination, compares the determined first field of illumination and the determined second field of illumination to determine, a change in the field of illumination illuminated by the directed light source between capture of the first frame of image data and capture of the second frame of image data, the change in the field of illumination being indicative of a change in alignment of the directed light source relative to the vehicle when the change in the field of illumination between capture of the first frame of image data and capture of the second frame of image data is greater than a predetermined threshold; and
   wherein, responsive to determining a change in the field of illumination that is indicative of a change in alignment of the directed light source relative to the vehicle, the control at least one selected from the group consisting of (i) adjusts the directed light source to accommodate the change in alignment of the directed light source and (ii) generates an alert to an occupant in the vehicle.

2. The vehicular vision system of claim 1, wherein the camera is disposed at the directed light source.

3. The vehicular vision system of claim 2, wherein the camera is connected to the directed light source.

4. The vehicular vision system of claim 1, further comprising a display device disposed in a cabin of the vehicle and viewable by a driver of the vehicle, the display device operable to display video images derived from image data captured by said camera.

5. The vehicular vision system of claim 4, wherein the control, responsive to the determined change in the field of illumination, generates the alert to the occupant in the vehicle, and wherein the display device displays the generated alert.

6. The vehicular vision system of claim 1, wherein the camera is disposed behind a windshield of the vehicle with the camera viewing forward of the vehicle through the windshield.

7. The vehicular vision system of claim 1, wherein the control, via image processing by the image processor of at least the first and second frames of image data captured by the camera, determines a degree of vertical misalignment of the directed light source by (i) determining, via processing by the image processor of the first frame of captured image data, a first artificial horizon, (ii) determining, via processing by the image processor of the second frame of captured image data, a second artificial horizon, and (iii) determining a difference between the first artificial horizon and the second artificial horizon, the determined difference being indicative of the degree of vertical misalignment of the directed light source.

8. The vehicular vision system of claim 1, wherein the control, responsive to the determined change in the field of illumination, adjusts the directed light source to accommodate the determined change in alignment of the directed light source.

9. The vehicular vision system of claim 1, wherein the control, responsive to the determined change in the field of illumination, generates the alert to the occupant in the vehicle.

10. The vehicular vision system of claim 1, wherein the control, responsive to the determined change in the field of illumination, adjusts the camera to accommodate the determined change in alignment of the directed light source.

11. The vehicular vision system of claim 1, wherein the control, responsive to the determined change in the field of illumination, adjusts image processing of image data captured by the camera to accommodate the determined change in alignment of the directed light source.

12. A vehicular vision system, the vehicular vision system comprising:
a camera disposed at a headlamp of a vehicle, the camera having a field of view at least forward of the vehicle, the camera operable to capture frames of image data representative of an area forward of the vehicle;
a directed light source disposed at the vehicle and operable to emit light when activated, wherein the directed light source comprises the headlamp of the vehicle, and wherein light emitted by the directed light source, when activated, illuminates a field of illumination forward of the vehicle;
wherein the field of view of the camera encompasses at least a portion of the field of illumination;
a control comprising an image processor and associated circuitry, wherein frames of image data captured by the camera are provided to the control for processing by the image processor;
wherein the frames of image data provided to the control comprise (i) a first frame of image data captured by the camera with the directed light source set to a selected light setting, and (ii) a second frame of image data captured by the camera subsequent to the first frame of image data and with the directed light source set to the selected light setting;
wherein the control, via image processing by the image processor of at least the first and second frames of image data captured by the camera, determines (i) a first field of illumination of the directed light source present in the first frame of image data and indicative of alignment of the directed light source relative to the vehicle during capture of the first frame of image data, and (ii) a second field of illumination of the directed light source present in the second frame of image data and indicative of alignment of the directed light source relative to the vehicle during capture of the second frame of image data;
wherein the control, responsive to determining the first field of illumination and the second field of illumination, compares the determined first field of illumination and the determined second field of illumination to determine, a change in the field of illumination illuminated by the directed light source between capture of the first frame of image data and capture of the second frame of image data, the change in the field of illumination being indicative of a change in alignment of the directed light source relative to the vehicle when the change in the field of illumination between capture of the first frame of image data and capture of the second frame of image data is greater than a predetermined threshold; and
wherein, responsive to determining a change in the field of illumination that is indicative of a change in alignment of the directed light source relative to the vehicle, the control at least one selected from the group consisting of (i) adjusts the directed light source to accommodate the change in alignment of the directed light source, (ii) generates an alert to an occupant in the vehicle, (iii) adjusts the camera to accommodate the determined change in alignment of the directed light source and (iv) adjusts image processing of image data captured by the camera to accommodate the determined change in alignment of the directed light source.

13. The vehicular vision system of claim 12, wherein the control, via image processing by the image processor of at least the first and second frames of image data captured by the camera, determines a degree of vertical misalignment of the directed light source by (i) determining, via processing by the image processor of the first frame of captured image data, a first artificial horizon, (ii) determining, via processing by the image processor of the second frame of captured image data, a second artificial horizon, and (iii) determining a difference between the first artificial horizon and the second artificial horizon, the determined difference being indicative of the degree of vertical misalignment of the directed light source.

14. The vehicular vision system of claim 12, wherein the control, responsive to the determined change in the field of illumination, adjusts the directed light source to accommodate the determined change in alignment of the directed light source.

15. The vehicular vision system of claim 12, wherein the control, responsive to the determined change in the field of illumination, generates the alert to the occupant in the vehicle.

16. The vehicular vision system of claim 12, wherein the control, responsive to the determined change in the field of illumination, adjusts the camera to accommodate the determined change in alignment of the directed light source.

17. The vehicular vision system of claim 12, wherein the control, responsive to the determined change in the field of illumination, adjusts image processing of image data captured by the camera to accommodate the determined change in alignment of the directed light source.

18. A vehicular vision system, the vehicular vision system comprising:
a camera disposed behind a windshield of a vehicle, the camera having a field of view through the windshield and at least forward of the vehicle, the camera operable to capture frames of image data representative of an area forward of the vehicle;
a directed light source disposed at the vehicle and operable to emit light when activated, wherein the directed light source comprises a headlamp of the vehicle, and wherein light emitted by the directed light source, when activated, illuminates a field of illumination forward of the vehicle;
wherein the field of view of the camera encompasses at least a portion of the field of illumination;
a control comprising an image processor and associated circuitry, wherein frames of image data captured by the camera are provided to the control for processing by the image processor;
wherein the frames of image data provided to the control comprise (i) a first frame of image data captured by the camera with the directed light source set to a selected light setting, and (ii) a second frame of image data captured by the camera subsequent to the first frame of image data and with the directed light source set to the selected light setting;
wherein the control, via image processing by the image processor of at least the first and second frames of image data captured by the camera, determines (i) a first field of illumination of the directed light source present in the first frame of image data and indicative of alignment of the directed light source relative to the vehicle during capture of the first frame of image data, and (ii) a second field of illumination of the directed light source present in the second frame of image data and indicative of alignment of the directed light source relative to the vehicle during capture of the second frame of image data;
wherein the control, responsive to determining the first field of illumination and the second field of illumination, compares the determined first field of illumination and the determined second field of illumination to determine, a change in the field of illumination illuminated by the directed light source between capture of the first frame of image data and capture of the second frame of image data, the change in the field of illumination being indicative of a change in alignment of the directed light source relative to the vehicle when the change in the field of illumination between capture of the first frame of image data and capture of the second frame of image data is greater than a predetermined threshold; and
wherein, responsive to determining a change in the field of illumination that is indicative of a change in alignment of the directed light source relative to the vehicle, the control at least one selected from the group consisting of (i) adjusts the directed light source to accommodate the change in alignment of the directed light source, (ii) generates an alert to an occupant in the vehicle, (iii) adjusts the camera to accommodate the determined change in alignment of the directed light source and (iv) adjusts image processing of image data captured by the camera to accommodate the determined change in alignment of the directed light source.

19. The vehicular vision system of claim 18, wherein the control, via image processing by the image processor of at least the first and second frames of image data captured by the camera, determines a degree of vertical misalignment of the directed light source by (i) determining, via processing by the image processor of the first frame of captured image data, a first artificial horizon, (ii) determining, via processing by the image processor of the second frame of captured image data, a second artificial horizon, and (iii) determining a difference between the first artificial horizon and the second artificial horizon, the determined difference being indicative of the degree of vertical misalignment of the directed light source.

20. The vehicular vision system of claim 18, wherein the control, responsive to the determined change in the field of illumination, adjusts the directed light source to accommodate the determined change in alignment of the directed light source.

21. The vehicular vision system of claim 18, wherein the control, responsive to the determined change in the field of illumination, generates the alert to the occupant in the vehicle.

22. The vehicular vision system of claim 18, wherein the control, responsive to the determined change in the field of illumination, adjusts the camera to accommodate the determined change in alignment of the directed light source.

23. The vehicular vision system of claim 18, wherein the control, responsive to the determined change in the field of illumination, adjusts image processing of image data captured by the camera to accommodate the determined change in alignment of the directed light source.

24. The vehicular vision system of claim 18, wherein the camera is connected to the directed light source.

* * * * *

UNITED STATES PATENT AND TRADEMARK OFFICE
CERTIFICATE OF CORRECTION

PATENT NO. : 11,667,231 B2
APPLICATION NO. : 16/693532
DATED : June 6, 2023
INVENTOR(S) : Martin Solar et al.

Page 1 of 1

It is certified that error appears in the above-identified patent and that said Letters Patent is hereby corrected as shown below:

In the Claims

Column 4
Claim 1, Lines 54-55, "to determine, a change" should be --to determine a change--

Column 6
Claim 12, Lines 30-31, "to determine, a change" should be --to determine a change--

Column 8
Claim 18, Lines 1-2, "to determine, a change" should be --to determine a change--

Signed and Sealed this
Fourth Day of July, 2023

Katherine Kelly Vidal
*Director of the United States Patent and Trademark Office*